US012526952B2

(12) United States Patent
Kamezaki et al.

(10) Patent No.: US 12,526,952 B2
(45) Date of Patent: Jan. 13, 2026

(54) ELECTRONIC DEVICE

(71) Applicant: Panasonic Intellectual Property Management Co., Ltd., Osaka (JP)

(72) Inventors: Hiroki Kamezaki, Osaka (JP); Hiroki Yosho, Osaka (JP); Junichi Hasegawa, Osaka (JP); Shintarou Tanaka, Osaka (JP); Kyota Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 151 days.

(21) Appl. No.: 18/231,808

(22) Filed: Aug. 9, 2023

(65) Prior Publication Data

US 2023/0389221 A1  Nov. 30, 2023

Related U.S. Application Data

(63) Continuation of application No. PCT/JP2022/002320, filed on Jan. 24, 2022.

(30) Foreign Application Priority Data

Feb. 26, 2021 (JP) ................. 2021-029447

(51) Int. Cl.
*G06F 1/00* (2006.01)
*G06F 1/20* (2006.01)
(Continued)

(52) U.S. Cl.
CPC ......... *H05K 7/20145* (2013.01); *G06F 1/203* (2013.01)

(58) Field of Classification Search
CPC ........ H05K 7/20145; G06F 1/203; G06F 1/20
See application file for complete search history.

(56) References Cited

U.S. PATENT DOCUMENTS 6,816,371 B2 * 11/2004 Agata ............... G06F 1/203
  361/679.48
8,625,279 B2 * 1/2014 Hata ................ G06F 1/203
  361/679.48
(Continued)

FOREIGN PATENT DOCUMENTS

JP    H05-119869 A    5/1993
JP    H11-087961 A    3/1999
(Continued)

OTHER PUBLICATIONS

International Search Report for corresponding Application No. PCT/JP2022/002320, mailed Apr. 5, 2022.

*Primary Examiner* — Rockshana D Chowdhury
(74) *Attorney, Agent, or Firm* — Renner, Otto, Boisselle & Sklar, LLP

(57) ABSTRACT

An electronic device includes a first unit and a second unit including a display device. The first unit includes a housing, a blower device, and an exhaust path. The exhaust path includes a first member, a second member, a third member, and a partition member. The second member faces the second unit positioned at an opened position. The third member faces the first member and extends from an end of the second member far from the first member in a direction away from the first member as the third member is away from the second member. The partition member is disposed at an end close to the second member in a first direction and between the first member and the third member, and extends along the first direction. The second member includes a first exhaust hole. The third member includes a second exhaust hole larger than the first exhaust hole.

8 Claims, 4 Drawing Sheets

(51) Int. Cl.
*H05K 7/00* (2006.01)
*H05K 7/20* (2006.01)

(56) References Cited

U.S. PATENT DOCUMENTS

| | | | | |
|---|---|---|---|---|
| 8,929,070 | B2* | 1/2015 | Liu | H05K 7/20145 |
| | | | | 165/104.34 |
| 8,937,806 | B2* | 1/2015 | Senatori | G06F 1/203 |
| | | | | 361/694 |
| 8,964,383 | B2* | 2/2015 | Degner | G06F 1/203 |
| | | | | 361/679.48 |
| 9,304,558 | B2* | 4/2016 | Horii | G06F 1/1616 |
| 9,575,524 | B1* | 2/2017 | Prather | G06F 1/1662 |
| 9,907,201 | B2* | 2/2018 | Degner | G06F 1/203 |
| 10,948,953 | B2* | 3/2021 | Degner | H05K 7/20145 |
| 11,269,388 | B2* | 3/2022 | Kitamura | F04D 29/706 |
| 11,683,907 | B2* | 6/2023 | Pedoeem | H05K 7/20545 |
| | | | | 361/692 |
| 11,711,904 | B2* | 7/2023 | Rehak | H05K 7/20154 |
| | | | | 361/692 |
| 11,963,329 | B2* | 4/2024 | Pedoeem | H05K 7/20145 |
| 12,019,486 | B2* | 6/2024 | Wang | H05K 7/20145 |
| 12,075,593 | B2* | 8/2024 | Tsuchida | G06F 1/20 |
| 12,075,594 | B2* | 8/2024 | Yang | H05K 7/2039 |
| 2002/0053421 | A1 | 5/2002 | Hisano et al. | |
| 2013/0327507 | A1 | 12/2013 | Degner et al. | |
| 2015/0062818 | A1 | 3/2015 | Horii et al. | |
| 2015/0084490 | A1 | 3/2015 | Fujiwara | |
| 2017/0060201 | A1 | 3/2017 | Prather et al. | |
| 2020/0187381 | A1* | 6/2020 | Degner | G06F 1/203 |
| 2020/0243947 | A1* | 7/2020 | Yamamoto | H01Q 1/526 |
| 2023/0387571 | A1* | 11/2023 | Fukagawa | G06F 1/1616 |
| 2023/0389221 | A1* | 11/2023 | Kamezaki | G06F 1/203 |

FOREIGN PATENT DOCUMENTS

| | | |
|---|---|---|
| JP | 2000-207064 A | 7/2000 |
| JP | 2004-194001 A | 7/2004 |
| JP | 2005-321287 A | 11/2005 |
| JP | 2015-049591 A | 3/2015 |

* cited by examiner

ELECTRONIC DEVICE

BACKGROUND

1. Technical Field

The present disclosure relates to an electronic device.

2. Description of the Related Art

Patent Literature (PTL) 1 discloses an electronic device including a first housing, a fan accommodated in the first housing, and a second housing rotatably connected to the first housing and having a liquid crystal display device. In the electronic device, a third wall of the first housing facing the second housing has a first exhaust hole and a second exhaust hole that exhaust air from the fan to an outside.

PTL 1 is Unexamined Japanese Patent Publication No. 2004-194001.

SUMMARY

The electronic device of PTL 1 has room for improvement in preventing deterioration of the liquid crystal display device due to heat exhausted to an outside of the first housing.

An object of the present disclosure is to provide an electronic device capable of preventing deterioration of a display device due to heat exhausted into a housing.

An electronic device according to one aspect of the present disclosure includes a first unit, and a second unit that includes a display device, the second unit being connected to the first unit to be rotatable between a closed position where the display device closely faces the first unit and an opened position where the display device is away from the first unit at an angle with respect to the first unit. The first unit includes a housing, a blower device that is disposed inside the housing, the blower device sending air from an air outlet along a first direction toward the second unit positioned at the opened position, and an exhaust path that is provided in the housing, the exhaust path being disposed downstream of the blower device with respect to a flow of the air sent by the blower device. The exhaust path includes a first member including a guide surface that guides the air sent by the blower device along the first direction, a second member that extends in a second direction intersecting the guide surface from an end of the first member far from the blower device in the first direction, the second member facing the second unit positioned at the opened position, a third member that faces the first member, the third member extending from an end of the second member far from the first member in the second direction in a direction away from the first member in the second direction as the third member is away from the second member in the first direction, and a partition member that is disposed at an end close to the second member in the first direction inside the exhaust path and between the first member and the third member in the second direction, the partition member extending along the first direction. The second member includes a first exhaust hole that communicates with an inside of the housing and an outside of the housing, and the third member includes a second exhaust hole that communicates with the inside of the housing and the outside of the housing, the second exhaust hole being larger than the first exhaust hole.

According to the present disclosure, it is possible to realize the electronic device capable of preventing the deterioration of the display device due to the heat exhausted to the outside of the housing.

DETAILED DESCRIPTION

Background to Present Disclosure

Figure 1:
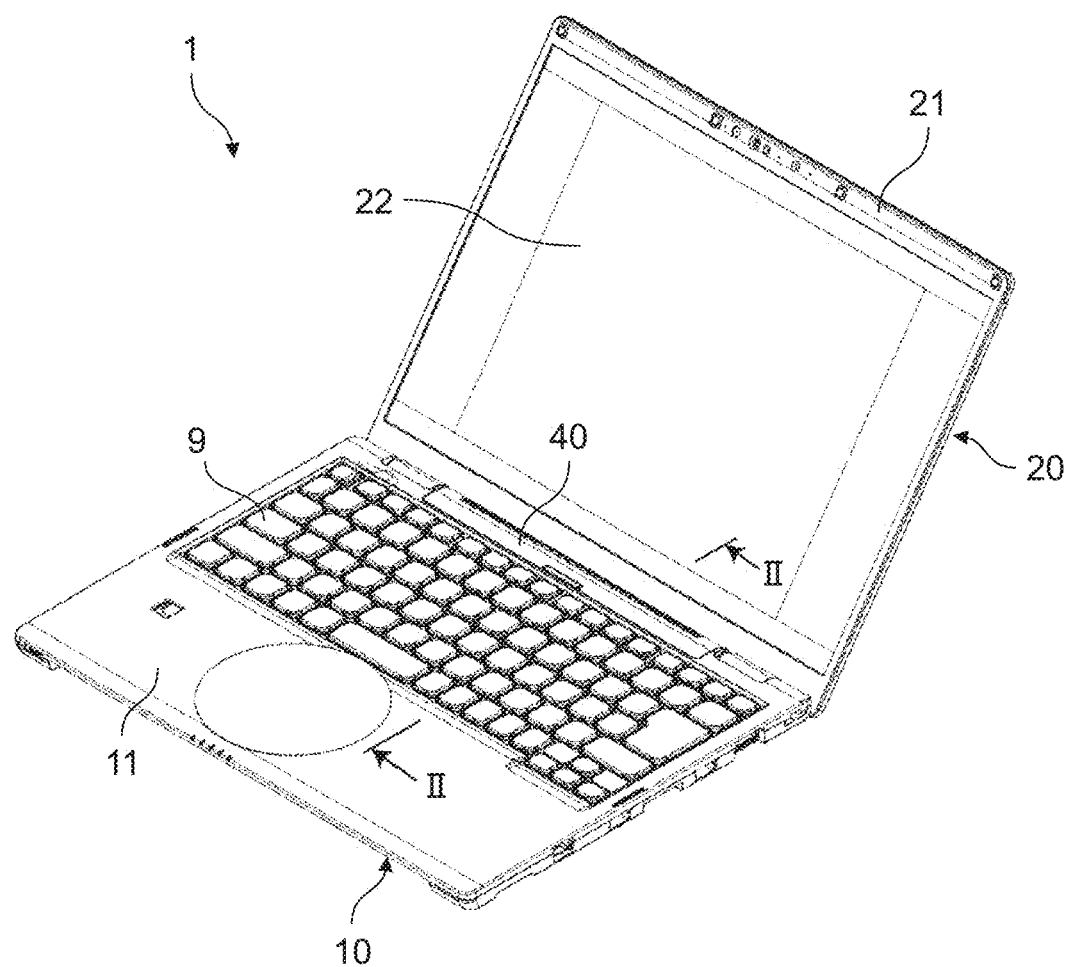
FIG. 1 is a schematic perspective view illustrating an electronic device of an exemplary embodiment of the present disclosure.

In the electronic device of PTL 1, the air from the fan exhausted from the first exhaust hole is blown to a surface of the second housing on which a display screen of the liquid crystal display device is disposed. Thus, the heat exhausted to an outside of the second housing by wind from the fan directly hits the display screen, and it may be difficult to prevent deterioration of a liquid crystal.

The present inventors have devised an electronic device capable of preventing deterioration of a display device due to air sent from a blower device, and have reached the following invention.

An electronic device according to a first aspect of the present disclosure includes a first unit, and a second unit that includes a display device, the second unit being connected to the first unit to be rotatable between a closed position where the display device closely faces the first unit and an opened position where the display device is away from the first unit at an angle with respect to the first unit. The first unit includes a housing, a blower device that is disposed inside the housing, the blower device sending air from an air outlet along a first direction toward the second unit positioned at the opened position, and an exhaust path that is provided in the housing, the exhaust path being disposed downstream of the blower device with respect to a flow of the air sent by the blower device. The exhaust path includes a first member including a guide surface that guides the air sent by the blower device along the first direction, a second member that extends in a second direction intersecting the guide surface from an end of the first member far from the blower device in the first direction, the second member facing the second unit positioned at the opened position, a third member that faces the first member, the third member extending from an end of the second member far from the first member in the second direction in a direction away from the first member in the second direction as the third member is away from the second member in the first direction, and a partition member that is disposed at an end close to the second member in the first direction inside the exhaust path and between the first member and the third member in the second direction, the partition member extending along the first direction. The second member includes a first exhaust hole that communicates with an inside of the housing and an outside of the housing, and the third member includes a second exhaust hole that communicates with the inside of the housing and the outside of the housing, the second exhaust hole being larger than the first exhaust hole.

According to the electronic device of the first aspect, it is possible to realize the electronic device capable of preventing the deterioration of the display device due to the heat exhausted to the outside of the housing.

In an electronic device according to a second aspect of the present disclosure, the first exhaust hole is disposed at an end of the second member close to the first member in the second direction, and a length of the first exhaust hole in the second direction is smaller than a length of the second member from the first exhaust hole to the third member in the second direction.

According to the electronic device of the second aspect, it is possible to realize the electronic device capable of more reliably preventing the deterioration of the display device due to the air sent from the blower device.

In an electronic device according to a third aspect of the present disclosure, the second exhaust hole is disposed at an end of the third member close to the second member in the first direction, and a length of the first exhaust hole in the second direction is smaller than a length of the partition member in the first direction.

According to the electronic device of the third aspect, it is possible to realize the electronic device capable of more reliably preventing the deterioration of the display device due to the heat exhausted to the outside of the housing.

In an electronic device according to a fourth aspect of the present disclosure, the exhaust path includes auxiliary guide members disposed at both sides of the air outlet in a third direction intersecting the first direction and the second direction.

According to the electronic device of the fourth aspect, the air sent by the blower device can be more reliably guided along the first direction.

Hereinafter, exemplary embodiments of the present disclosure will be described with reference to the drawings. Note that, in the drawings, the same components are denoted by the same reference marks, and description thereof will be omitted as appropriate. In addition, the exemplary embodiments are not intended to limit the present disclosure, but are examples, and can be appropriately changed without departing from the gist of the present disclosure.

As illustrated in FIG. 1, as an example, electronic device 1 of the present exemplary embodiment is, for example, a notebook personal computer (in other words, laptop PC). Electronic device 1 includes first unit 10 and second unit 20. Second unit 20 is rotatably attached to first unit 10 through a pair of hinges 30.

First unit 10 includes first housing 11 and input unit 15 provided in first housing 11. As an example, first housing 11 has a substantially rectangular plate shape. Input unit 15 is disposed on one surface intersecting a thickness direction of first housing 11, and includes, for example, a keyboard 9 and a touch pad on which a user can perform input processing. In FIG. 1, a part of a configuration of first unit 10 is omitted.

Second unit 20 includes second housing 21 and display device 22 provided in second housing 21. As an example, second housing 21 has a substantially plate shape. Display device 22 is disposed on one surface intersecting a thickness direction of second housing 21, and is, for example, a liquid crystal display panel having a substantially rectangular shape. Second unit 20 incorporates a central processing unit (CPU), a volatile storage (RAM), a nonvolatile storage (ROM, SSD, or the like), a battery, and the like. The nonvolatile storage stores an operating system (OS), various application programs, various data, and the like. The central processing unit executes arithmetic processing by reading the OS, the application programs, and the various data, thereby realizing various functions.

The pair of hinges 30 can hold second unit 20 at any angle with respect to first unit 10 by rotating second unit 20 with respect to first unit 10 about a rotation shaft extending along a longitudinal direction of first housing 11. For example, as illustrated in FIG. 1, electronic device 1 can hold second unit 20 in an opened state having any angle (for example, approximately 120 degrees illustrated in FIG. 1) with respect to first unit 10 by the pair of hinges 30. In addition, in electronic device 1, second unit 20 can be held in a closed state forming an angle of substantially 0 degrees with respect to first unit 10 by the pair of hinges 30. That is, the second unit is rotatably connected with respect to first unit between closed position P1 where display device 22 is in a closed state approaching and facing first unit 10 and opened position P2 where display device 22 is in an opened state of being away from first unit 10 at an angle with respect to first unit 10.

Next, the configuration of first unit 10 will be described in more detail.

Figure 2:
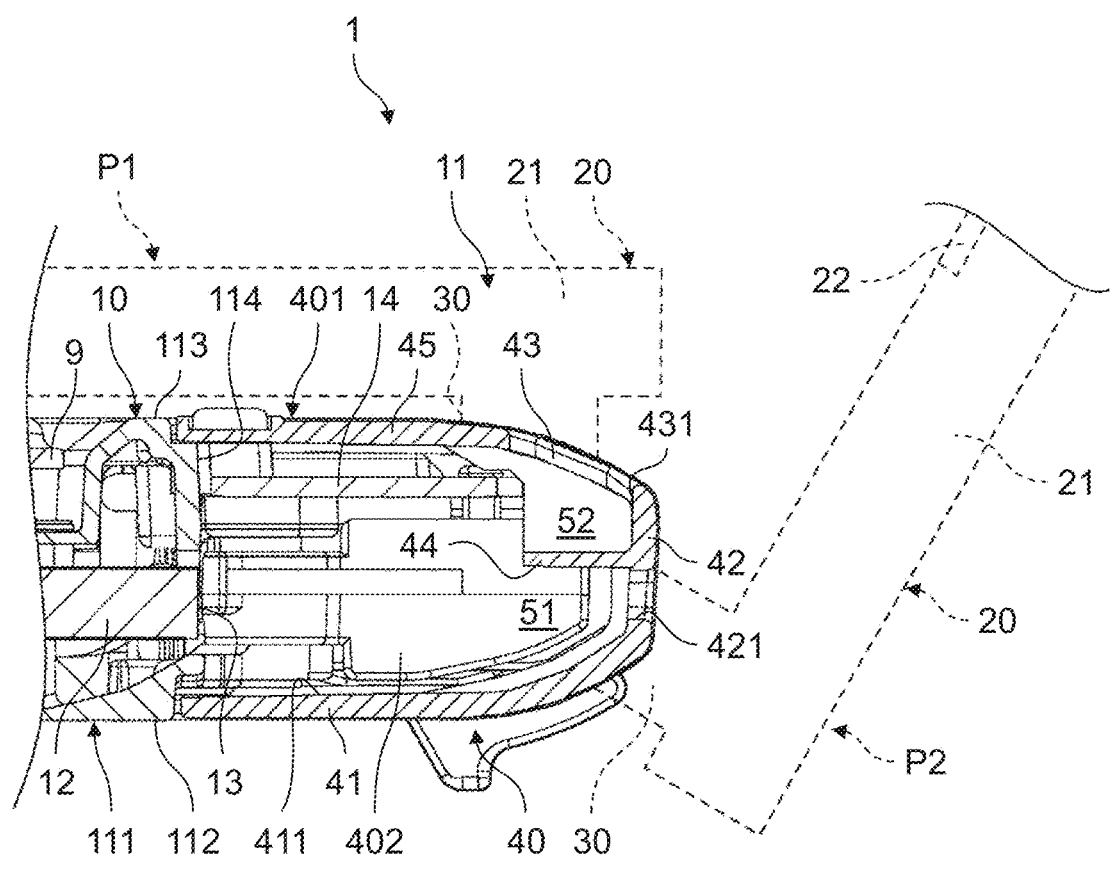
FIG. 2 is a cross-sectional view taken along line II-II of FIG. 1.
Figure 2:
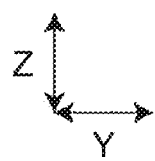

As illustrated in FIG. 2, first unit 10 includes first housing 11 and blower device 12.

As illustrated in FIG. 2, first housing 11 includes a main body 111 and exhaust path 40. Main body 111 has first surface 112 and second surface 113 intersecting a thickness direction (for example, Z direction), and third surface 114 intersecting first surface 112 and second surface 113. Input unit 15 is disposed on second surface 113. In the present exemplary embodiment, third surface 114 constitutes one side surface of first housing 11 in a lateral direction (for example, Y direction), and faces second unit 20 positioned at opened position P2.

Blower device 12 is by, for example, a centrifugal fan, and is disposed inside main body 111 of first housing 11 as illustrated in FIG. 2. Blower device 12 has air outlet 13 and sends air from air outlet 13 along a first direction (for example, Y direction) toward second unit 20 positioned at opened position P2. In the present exemplary embodiment, air outlet 13 is disposed on third surface 114 of first housing 11.

As illustrated in FIG. 2, exhaust path 40 is provided in first housing 11 and is disposed downstream of blower device 12 with respect to a flow of air sent by blower device 12. In the present exemplary embodiment, exhaust path 40 includes guide member 401 separate from main body 111 of first housing 11 and auxiliary guide members 402. Guide member 401 includes first member 41, second member 42, third member 43, and partition member 44, and is disposed at an end of first housing 11 close to third surface 114 to cover antenna 14. Guide member 401 further includes fourth member 45 and has a substantially C shape as a whole. Auxiliary guide member 402 is formed separately from guide member 401. Antenna 14 is disposed between partition member 44 and fourth member 45.

First member 41 has, for example, a plate shape and extends along first surface 112. First member 41 includes guide surface 411 that guides the air sent by blower device 12 along first direction Y. An end of first member 41 close to second member 42 in first direction Y is inclined in a direction away from first surface 112 along the second direction (for example, Z direction,) intersecting guide surface 411, and is slightly recessed and curved in second direction Z and in a direction away from second surface 113.

Second member 42 has, for example, a plate shape, and is disposed between third surface 114 and second unit 20 positioned at opened position P2 in first direction Y. Second member 42 faces second unit 20 positioned at opened position P2 and extends in second direction Z from an end of first member 41 far from blower device 12 in first direction Y. First exhaust holes 421 that penetrate second member 42 in first direction Y and communicate with an inside of first housing 11 and an outside of first housing 11 are provided in second member 42. In the present exemplary embodiment, first exhaust holes 421 are disposed at an end close to first member 41 in second direction Z.

Third member 43 has, for example, a plate shape, extends from second member 42 toward main body 111 of first housing 11, and faces first member 41 in a thickness direction. Specifically, third member 43 extends from an end of second member 42 far from first member 41 in second direction Z in a direction away from first member 41 in second direction Z as the third member is away from second member 42 in first direction Y. In the present exemplary embodiment, third member 43 is slightly recessed and curved in the direction away from first surface 112 in second direction Z. Second exhaust holes 431 that penetrate third member 43 in a thickness direction, communicate with the inside of first housing 11 and the outside of first housing 11 and is larger than first exhaust hole 421 are provided in third member 43. In the present exemplary embodiment, second exhaust hole 431 is disposed at an end of third member 43 close to second member 42 in first direction Y.

Partition member 44 is disposed at an end close to second member 42 in first direction Y inside exhaust path 40 and between first member 41 and third member 43 in second direction Z. Partition member 44 partitions an exhaust path provided inside exhaust path 40 into first path 51 connected to first exhaust holes 421 and second path 52 connected to second exhaust holes 431. In the present exemplary embodiment, partition member 44 extends from a portion farther away from first member 41 than first exhaust holes 421 in second direction Z of second member 42 toward blower device 12 along first direction Y. Partition member 44 has substantially the same length in first direction Y as second exhaust hole 431 as viewed from second surface 113 side of first housing 11 along second direction Z.

Figure 3:
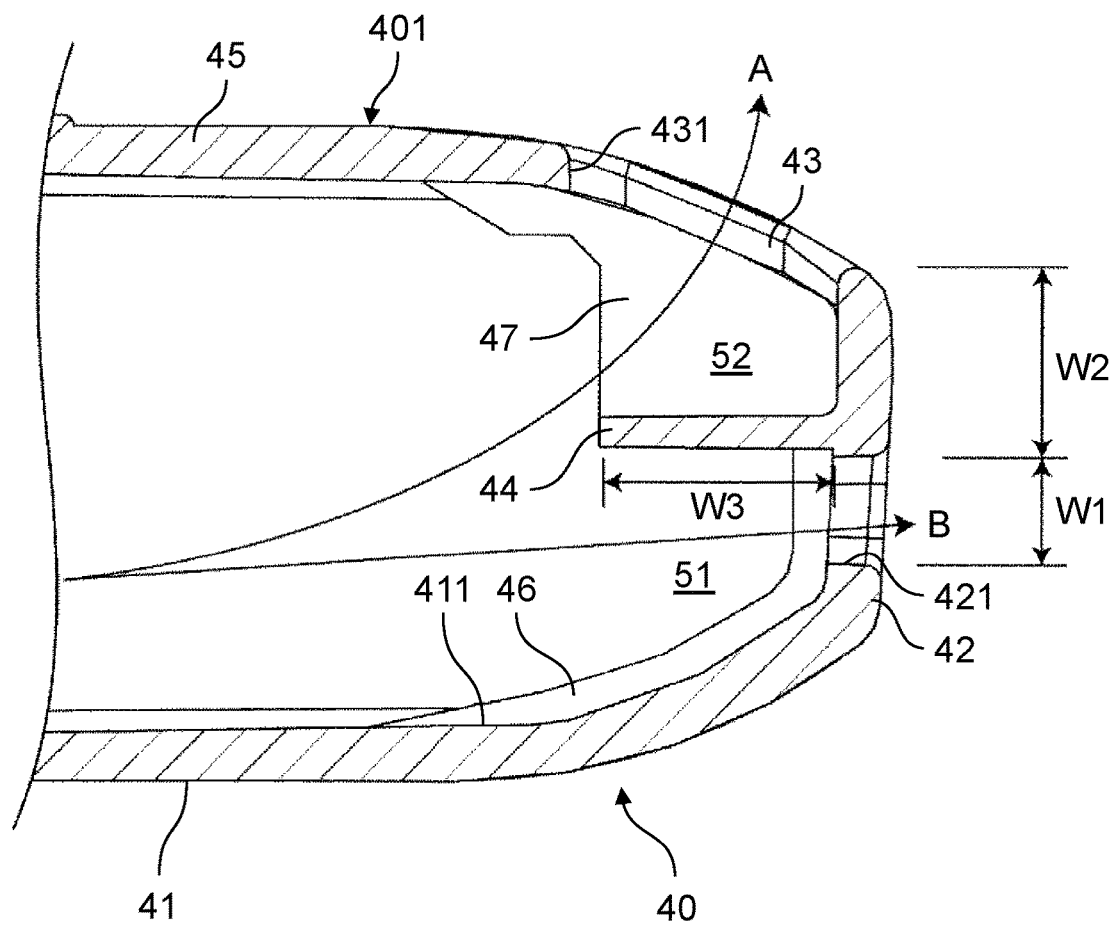
FIG. 3 is a partial cross-sectional view taken along line II-II of FIG. 1.

As illustrated in FIG. 3, in the present exemplary embodiment, length W1 of first exhaust hole 421 in second direction Z is smaller than length W2 of second member 42 from first exhaust hole 421 to third member 43 in second direction Z. In addition, length W1 of first exhaust hole 421 in second direction Z is smaller than length W3 of partition member 44 in first direction Y.

Fourth member 45 extends from an end of third member 43 far from second member 42 in first direction Y toward main body 111 of first housing 11 along first direction Y.

As illustrated in FIG. 2, auxiliary guide members 402 are disposed on both sides of air outlet 13 of blower device 12 in a third direction (for example, X direction) intersecting first direction Y and second direction Z. In FIG. 2, only one auxiliary guide member 402 is illustrated. Each auxiliary guide member 402 covers a gap surrounded by first member 41, second member 42, third member 43, and fourth member 45.

Figure 4:
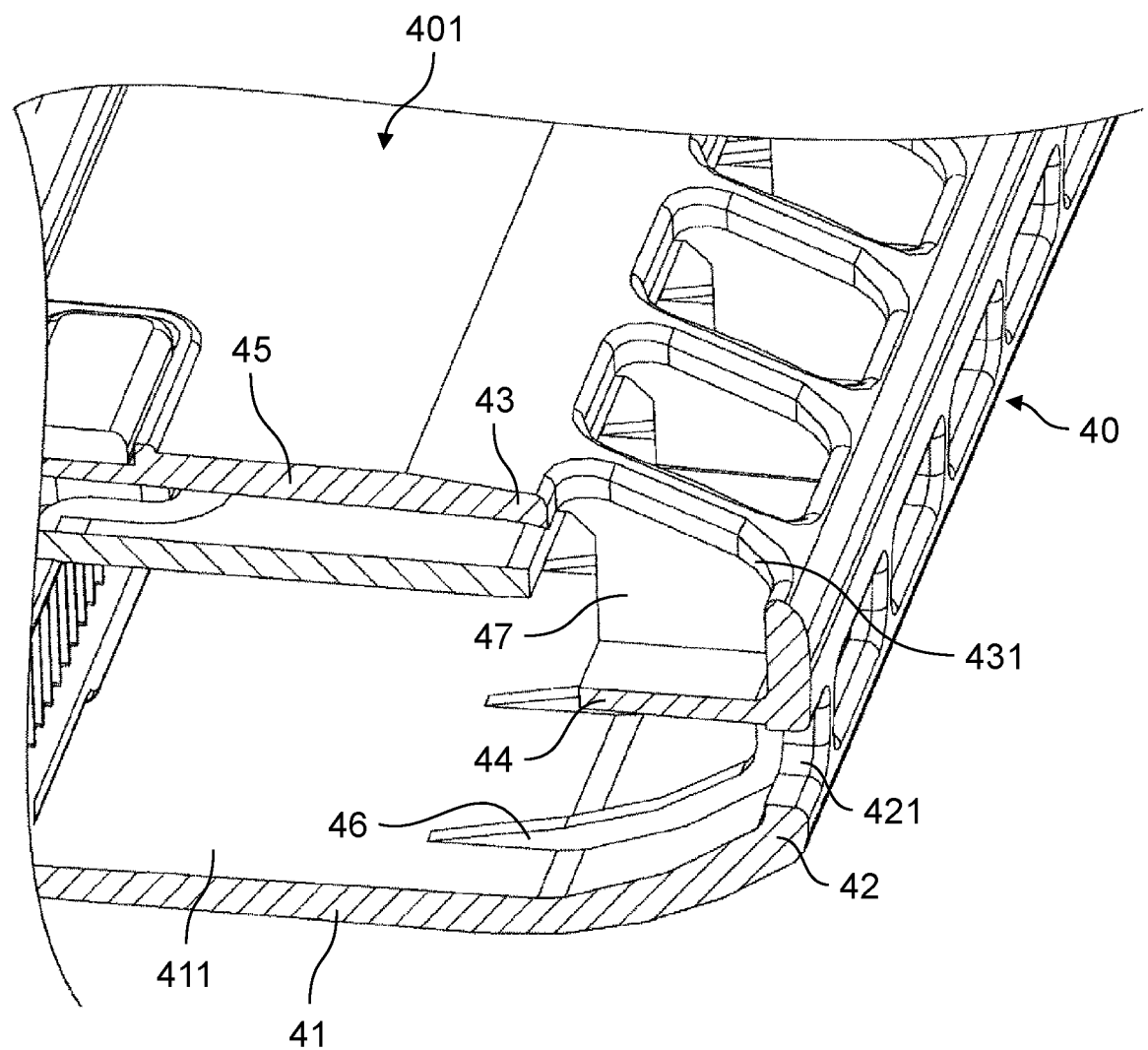
FIG. 4 is a perspective cross-sectional view taken along line II-II of FIG. 1.
Figure 4:
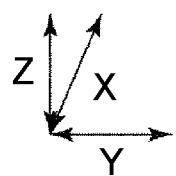

As illustrated in FIG. 4, in the present exemplary embodiment, a plurality of first exhaust holes 421 are provided in second member 42, and a plurality of second exhaust holes 431 are provided in third member 43. The plurality of first exhaust holes 421 are disposed side by side at equal intervals along third direction X. The plurality of second exhaust holes 431 are also disposed at equal intervals along third direction X. One second exhaust hole 431 is associated with each first exhaust hole 421. That is, each first exhaust hole 421 and corresponding second exhaust hole 431 are disposed side by side on a virtual straight line extending in first direction Y. Rib 46 is provided between adjacent first exhaust holes 421. Partition wall 47 is provided between adjacent second exhaust holes 431.

Next, a relationship between a position of second unit 20 with respect to first unit 10 and first path 51 and second path 52 will be described.

In a case where second unit 20 is positioned at opened position P2, as illustrated in FIG. 2, first exhaust hole 421 is smaller than second exhaust hole 431 and is covered with second unit 20. Thus, the air sent from blower device 12 is mainly guided to second path 52 by partition member 44, flows diagonally upward to the right (direction of arrow A) in FIG. 3, and is exhausted from second exhaust hole 431 to the outside of first housing 11.

An inclination angle of third member 43 with respect to second member 42 is set to an angle at which the air exhausted to the outside of first housing 11 through second exhaust hole 431 is not directly blown to display device 22 of second unit 20 positioned at opened position P2. In other words, second exhaust hole 431 regulates an exhaust direction of the air sent from blower device 12 in the direction of arrow A to prevent the air exhausted from second exhaust hole 431 from being directly blown to display device 22 of second unit 20 at opened position P2 positioned when the user uses electronic device 1.

In a case where second unit 20 is positioned at closed position P1, as illustrated in FIG. 2, second exhaust hole 431 is closed by second unit 20, and the air guided to second path 52 collides with second unit 20 and bounces back. Thus, the air sent from blower device 12 is mainly guided to first path 51, flows along a direction of arrow B in FIG. 3, and is exhausted from first exhaust hole 421 to the outside of first housing 11.

Electronic device 1 can exhibit the following effects.

Electronic device 1 includes first unit 10 and second unit 20 including display device 22. First unit 10 includes first housing 11, blower device 12 disposed inside first housing 11, and exhaust path 40 provided in first housing 11. Exhaust path 40 includes first member 41, second member 42, third member 43, and partition member 44. First member 41 includes guide surface 411 that guides the air sent by blower device 12 along the first direction. Second member 42 extends in the second direction from the end of first member 41 far from blower device 12 in the first direction, and faces second unit 20 positioned at opened position P2. The third member faces first member 41 and extends obliquely from the end of second member 42 far from first member 41 in the direction away from first member 41 in the second direction as the third member is away from second member 42 in the first direction. Partition member 44 is disposed at the end close to second member 42 inside exhaust path 40 in the first direction and between first member 41 and third member 43 in the second direction, and extends along the first direction. First exhaust hole 421 is provided in second member 42. Second exhaust hole 431 larger than first exhaust hole 421 is provided in third member 43. That is, in electronic device 1, the air sent by blower device 12 is mainly exhausted to the outside of first housing 11 through first exhaust hole 421 in a case where second unit 20 is positioned at closed position P1, and is mainly exhausted to the outside of housing 11 through second exhaust hole 431 in a case where the second unit is positioned at opened position P2. Since second exhaust hole 431 is provided in third member 43 to be inclined with respect to second member 42, it is possible to prevent the air sent from blower device 12 from being directly blown to display device 22 of second unit 20 positioned at opened position P2 for using electronic device 1. That is, it is possible to prevent deterioration of display device 22 due to heat exhausted from the inside of first housing 11 to the outside. As a result, it is possible to realize the electronic device capable of preventing the deterioration of the display device due to the air sent from the blower device.

First exhaust hole 421 is disposed at the end of second member 42 close to first member 41 in the second direction, and the length of first exhaust hole 421 in the second direction is smaller than the length of second member 42 from first exhaust hole 421 to third member 43 in the second direction. With such a configuration, since second exhaust hole 431 can be set to be larger than first exhaust hole 421, it is possible to realize electronic device 1 capable of more reliably preventing the deterioration of display device 22 due to the heat exhausted to the outside of first housing 11.

Second exhaust hole 431 is disposed at the end of third member 43 close to second member 42 in the first direction, and the length of first exhaust hole 421 in the second direction is smaller than the length of partition member 44 in the first direction. With such a configuration, since second exhaust hole 431 can be set to be larger than first exhaust hole 421, it is possible to realize electronic device 1 capable of more reliably preventing the deterioration of display device 22 due to the heat exhausted to the outside of first housing 11.

Exhaust path 40 includes auxiliary guide members 402 disposed on both sides of air outlet 13 of blower device 12 in the third direction intersecting the first direction and the second direction. With such a configuration, the air sent by blower device 12 can be more reliably guided along the first direction.

Electronic device 1 can also be configured as follows.

First unit 10 may have any configuration including first housing 11, blower device 12 disposed inside first housing 11, and exhaust path 40 provided in first housing 11.

Exhaust path 40 is not limited to a case where the exhaust path 40 is formed separately from main body 111 of first housing 11, and may be formed integrally with main body 111.

The inclination angle of third member 43 with respect to second member 42 can be set to any angle at which the air exhausted through second exhaust hole 431 is not directly blown to display device 22 of second unit 20 when the user uses electronic device 1.

Second member 42, third member 43, and partition member 44 may be configured such that second exhaust hole 431 is larger than first exhaust hole 421. First exhaust hole 421 can be provided at any position of second member 42, and second exhaust hole 431 can be provided at any position of third member 43. In addition, as possible, the length of first exhaust hole 421 in the second direction may be equal to or more than the length of second member 42 from first exhaust hole 421 to third member 43 in the second direction, or the length of first exhaust hole 421 in the second direction may be equal to or more than the length of partition member 44 in the first direction.

At least one of first exhaust hole 421 and second exhaust hole 431 may be provided. For example, one first exhaust hole 421 extending along third direction X may be provided in second member 42, or one second exhaust hole 431 extending along third direction X may be provided in third member 43. In this case, a partition wall may be provided inside one first exhaust hole 421 to form a plurality of first paths 51 (exhaust paths). Similarly, a partition wall may be provided inside one second exhaust hole 431 to form a plurality of second paths 52.

Rib 46 and partition wall 47 can be omitted. In addition, ribs 46 may be provided between all of adjacent first exhaust holes 421, or ribs 46 may be provided between some of adjacent first exhaust holes 421. Similarly, partition walls 47 may be provided between all of adjacent second exhaust holes 431, or partition walls 47 may be provided between some of adjacent second exhaust holes 431.

Auxiliary guide member 402 can be omitted.

Auxiliary guide member 402 may be a part of main body 111 of first housing 11, may be a member constituting a part of guide member 401, or may be a member different from main body 111 and guide member 401.

Any proper combination of the embodiments or modifications among the various exemplary embodiments and modifications may have the effects of the embodiments or modifications. In addition, a combination of exemplary embodiments, a combination of examples, or a combination of an exemplary embodiment and an example, and a combination of features of different exemplary embodiments or examples can be made.

Although the present disclosure has been described in connection with a preferable exemplary embodiment with reference to the accompanying drawings, various modifications and corrections are obvious to those skilled in the art. It is to be understood that such modifications and changes are included within the scope of the present disclosure according to the appended claims unless such modifications and changes depart from the scope of the present disclosure.

The present disclosure is widely applicable to electronic devices including notebook personal computers.

What is claimed is:

1. An electronic device comprising:
   a first unit; and
   a second unit that includes a display device, the second unit being connected to the first unit to be rotatable between a closed position where the display device closely faces the first unit and an opened position where the display device is away from the first unit at an angle with respect to the first unit, wherein
   the first unit includes
      a housing,
      a blower device that is disposed inside the housing, the blower device sending air from an air outlet along a first direction toward the second unit positioned at the opened position, and
      an exhaust path that is provided in the housing, the exhaust path being disposed downstream of the blower device with respect to a flow of the air sent by the blower device,
   the exhaust path includes
      a first member including a guide surface that guides the air sent by the blower device along the first direction,
      a second member that extends in a second direction intersecting the guide surface from an end of the first member far from the blower device in the first direction, the second member facing the second unit positioned at the opened position,
      a third member that faces the first member, the third member extending from an end of the second member far from the first member in the second direction in a direction away from the first member in the second direction as the third member is away from the second member in the first direction, and
      a partition member that is disposed between the first member and the third member in the second direction, the partition member extending along the first direction, the second member intersects the partition member and the third member and includes a first exhaust hole that communicates with an inside of the housing and an outside of the housing, the third member is farther from the first exhaust hole than the partition member in the second direction and includes a second exhaust hole that communicates with the inside of the housing and the outside of the housing, the second exhaust hole being larger than the first exhaust hole, and the second member includes a surface that is disposed between the partition member and the third member in the second direction.

2. The electronic device according to claim 1, wherein the first exhaust hole is disposed at an end of the second member close to the first member in the second direction, and a length of the first exhaust hole in the second direction is smaller than a length of the second member from the first exhaust hole to the third member in the second direction.

3. The electronic device according to claim 1, wherein the second exhaust hole is disposed at an end of the third member close to the second member in the first direction, and a length of the first exhaust hole in the second direction is smaller than a length of the partition member in the first direction.

4. The electronic device according to claim 1, wherein the exhaust path includes auxiliary guide members disposed at both sides of the air outlet in a third direction intersecting the first direction and the second direction.

5. The electronic device according to claim 1, wherein the third member extends in the second direction in a direction away from the partition member in the second direction as the third member is away from the second unit in the first direction.

6. The electronic device according to claim 1, wherein the third member further includes a second exhaust hole which is adjacent to the second exhaust hole, a partition wall is provided between two adjacent second exhaust holes, and the partition member supports the partition wall.

7. The electronic device according to claim 1, wherein a length of the partition member in the first direction is equal to and longer than a length of the second exhaust hole in the first direction.

8. The electronic device according to claim 1, wherein the first exhaust hole is covered with the second unit while the second unit is positioned at the opened position.

* * * * *